UNITED STATES PATENT OFFICE.

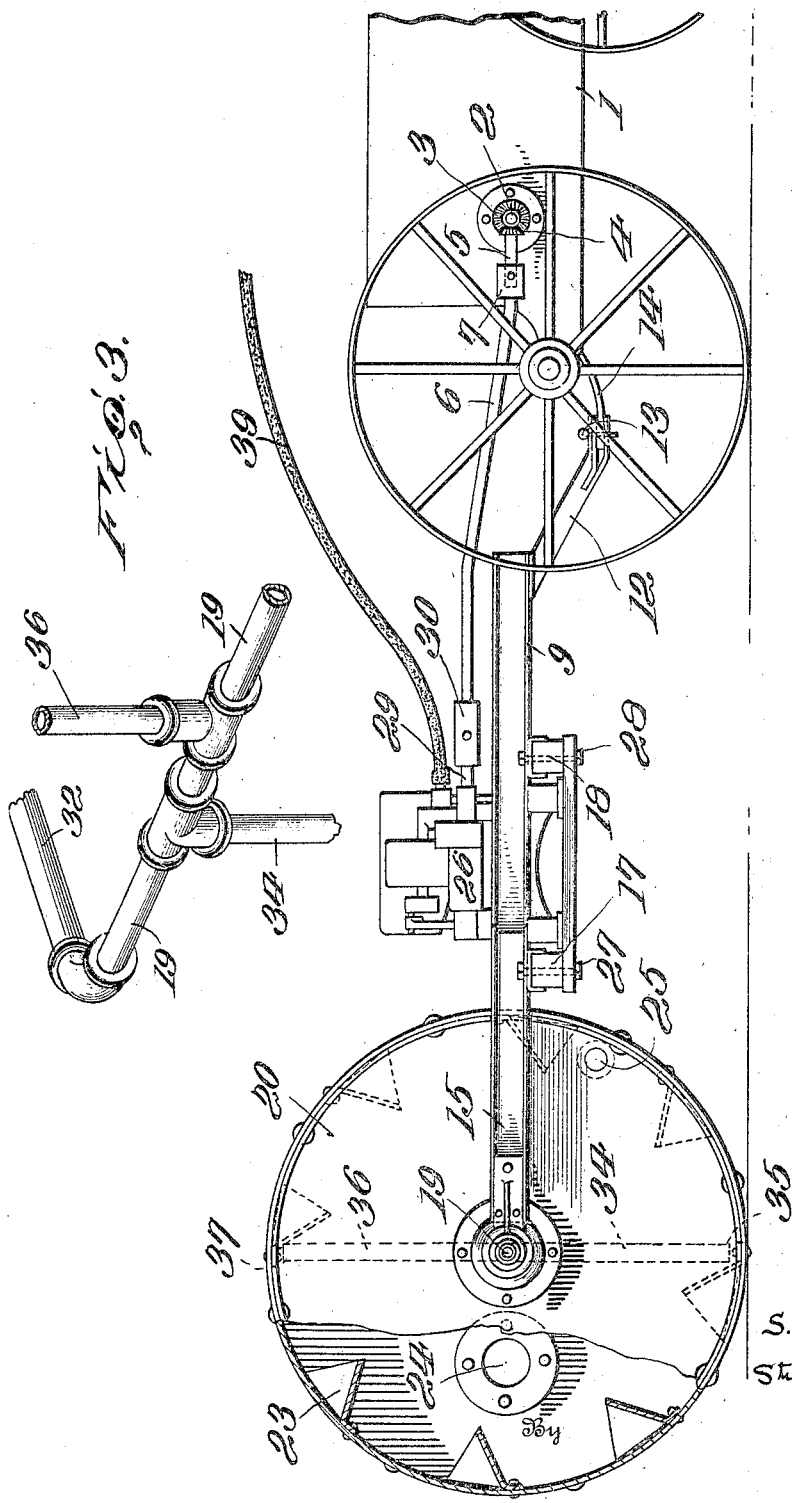

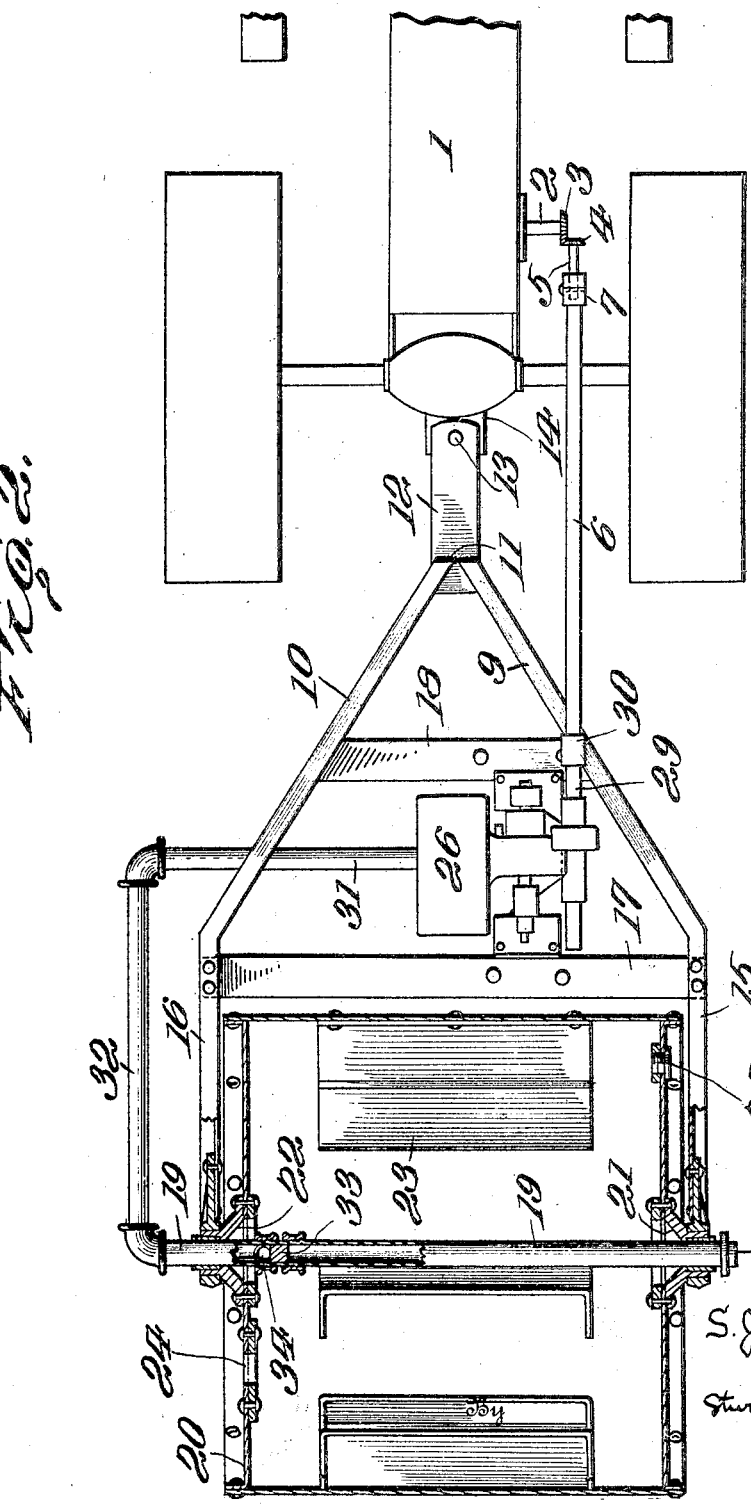

SAMUEL J. MILLER, OF WINTER HAVEN, FLORIDA.

TRACTOR-PROPELLED SPRAYING APPARATUS.

1,377,847.      Specification of Letters Patent.    Patented May 10, 1921.

Application filed September 13, 1920. Serial No. 409,789.

*To all whom it may concern:*

Be it known that I, SAMUEL J. MILLER, a citizen of the United States, residing at Winter Haven, in the county of Polk, State of Florida, have invented certain new and useful Improvements in Tractor-Propelled Spraying Apparatus, of which the following is a description, reference being had to the accompanying drawing and to the figures of reference marked thereon.

This invention relates to a liquid spraying apparatus, and more particularly to a device of the rotating tank type.

One of the objects of this invention is to provide a spraying apparatus of the kind described which is adapted to be propelled by a tractor and which includes suitable driving connections whereby the pump located either on the tractor or on the spraying apparatus is operated to force the spraying solution from the rotating tank to the sprayer or spray nozzles.

Another object of this invention resides in mounting the distributing pump directly on the spraying apparatus and providing a detachable driving connection between said pump and the tractor.

A further object of this invention resides in providing a spraying apparatus adapted to be propelled by a tractor, including a suitable frame on which is mounted a drum tank adapted to be rolled over the ground as the same is propelled by the tractor in order to thoroughly mix the spraying solution in the tank, the spraying apparatus being provided with suitable means for drawing the spraying liquid from the rotating tank and forcing it to the sprayer or spray nozzles.

Yet another aim of this invention resides in providing a sprayer frame with a journal on which the sprayer tank rotates, such journal forming an air inlet to the interior of the drum, and also a separate outlet through which the solution is drawn from the tank and pumped to the sprayer or spray nozzles.

These and other objects will in part be obvious and will in part be hereinafter more fully disclosed.

Referring more particularly to the accompanying drawings—

Figure 1 shows a perspective view partly in section of the combined tractor and spraying apparatus;

Fig. 2 is a plan view of the same, and

Fig. 3 is a detail perspective view of the arrangement of piping within the spraying drum.

In general, the invention comprises a propelled vehicle in the form of a trailer adapted to be connected to a tractor. At its rear end, the trailer is provided with a large tank drum, which as the trailer is drawn along the ground by the tractor, rotates to thoroughly mix the spraying solution. Suitably mounted on the trailer frame is a force pump having a pipe connection to the interior of the tank, and an outlet connection to the spraying apparatus. In addition, there is provided a detachable connection from the pump to the prime mover of the tractor.

Referring more particularly to the accompanying drawings, the tractor 1 suitably mounted on wheels is shown as provided with a shaft 2 connected to the power plant or other prime mover, which by means of the bevel gears 3 and 4, drives the shaft 5 coupled to an intermediate shaft 6 by means of a quick detachable coupling 7. The spraying apparatus has a detachable connection to the rear end of the tractor. This sprayer includes a suitable frame of any desired shape, but in the present instance is shown in Fig. 2 as formed of the V-shaped beams 9 and 10 joined at 11 to a coupling 12 adapted to be secured at any suitable point by a pin 13 to a member 14 at the rear of the tractor. The V-shaped beams 9 and 10 are continued rearwardly to form spaced journal bearings 15 and 16 braced by cross beams 17 and 18.

Suitably journaled at the rear of the bearings 15 and 16 is arranged a pipe 19 around which the tank drum 20 is adapted to rotate. This drum 20 is provided with any suitable arrangement of stuffing boxes 21, 22 to prevent the escape of fluid about the end bearings for the drum. The drum itself is formed internally with a series of inwardly projecting mixing vanes 23 adapted to lift the spraying solution as the drum rotates and thoroughly mix the same. If desired, the usual hand-hole 24 may be provided and also a filling opening 25.

Means is provided for drawing the solution from the tank drum and forcing it to the sprayer in the form of a pump 26 located either on the tractor itself or on the spraying apparatus. In the present construction, it is proposed to mount this pump 26 directly on the spraying apparatus, and to this end, the pump is fastened as by means of the bolts 27 and 28 to the cross beams 17 and 18. When the pump is thus mounted on the spraying apparatus, it is of course necessary to provide a detachable coupling from the drive shaft 6 connected to the source of power on the tractor to the pump shaft 29 by means of a second detachable coupling 30. On the other hand, if the pump be mounted directly on the tractor, this detachable coupling is not needed, it being only necessary to provide a detachable conduit from the pump to the interior of the tank drum.

In the present described construction, the pump is further provided with a suction conduit 31 connected as by means of the pipe 32 to one end of the journal pipe 19.

For the purpose of providing separate air inlet and solution discharge conduits, this pipe 19 is closed at a point intermediate its ends by means of a suitable plug 33 and on one side of this plug, the pipe 19 is provided with a depending pipe 34 which acts as a continuation of the suction line. As shown clearly in Fig. 1, the end 35 of this pipe terminates near the bottom of the interior of the tank and in a position to be constantly submerged when the tank has spraying liquid therein. The pipe 19 on the other side of the plug 33 is provided with an upstanding vent pipe 36 terminating within the drum above the spraying solution. As shown in Fig. 3, this pipe 36 communicates with the journal pipe 19, the opposite end 38 of which is open to the atmosphere.

In the operation, when it is desired to use this spraying apparatus, the device may be quickly attached to the rear end of the tractor and the driven shaft 29 of the pump coupled to the motive shaft 5 of the tractor by means of the intermediate shaft 6 and the couplings 7 and 30. The tractor being started, the spraying apparatus is trailed along therebehind, the drum tank rolling over the ground and thoroughly mixing the spraying solution, while by means of the before described driving connection between the tractor and the pump, the latter is operated to draw the spraying liquid from the end 35 of the suction line through the pipe 34 to one side of the plug 33, and thence by means of the suction line through the pump to the sprayer line 39, at the same time, free air is drawn from the atmosphere through the open end 38 of the journal pipe 19 up the pipe 36 and into the interior of the drum.

It is obvious that in lieu of the tank drum being rotated by contact with the ground, the sprayer frame may be suitably mounted on wheels and the drum or tank fitted with a gear or chain-driven mechanical agitator to mix the solution instead of rotating the tank.

It is obvious that the device of the above character is very advantageous in that it comprises a propellable vehicle which utilizes the movement of the vehicle itself for mixing the spraying solution, and in addition provides a convenient carrier for the sprayer pump, the arrangement being such that the apparatus may be quickly attached to the standard type of tractor, and the pump driven therefrom by a very simple form of coupling.

It is obvious that minor changes in the details of construction and the arrangement of parts may be made without departing from the spirit of the invention as set forth in the appended claims.

Having thus described the invention, what I claim as new and desire to secure by Letters-Patent, is—

1. A spraying apparatus comprising a frame having coupling means adapted to detachably connect said frame with a tractor, a mixing drum carried by said frame and rotatable as said frame is propelled, a pump mounted on said frame, a shaft connected to said pump and extending forwardly of said frame and provided with means for detachably connecting said shaft with a driving member on said tractor, connections from said pump to said drum for withdrawing solution therefrom.

2. A spraying apparatus comprising a frame having coupling means adapted to detachably connect said frame with a tractor, a pump on said frame, means for operating said pump, a pipe partitioned intermediate its ends and being open at one end to the atmosphere and connected to said pump at its other end, a mixing drum journaled on said frame for rotation concentrically about said pipe as said frame is propelled, a suction pipe communicating with the interior of the drum and with that side of the partition in the pipe communicating with the pump, an air vent pipe communicating with the interior of the drum and with that portion of said pipe leading to the open end thereof.

3. A spraying apparatus comprising a V-shaped frame having coupling means adapted to detachably connect said frame with a tractor, said frame having parallel members forming spaced bearings, a tank drum journaled on said bearings and adapted to be rotated by contact with the ground as the apparatus is propelled, a pump mounted at the forward part of said frame, a shaft connected to said pump and extending forwardly of said attachment for detachable connection to a driving element on said tractor, and connections from said tank to said pump whereby solution may be withdrawn from said tank and conducted to the spraying line.

In testimony whereof, I affix my signature.

SAMUEL J. MILLER.